United States Patent
Huang

(10) Patent No.: US 12,034,852 B2
(45) Date of Patent: Jul. 9, 2024

(54) BLOCK OPERATION METHOD, ELECTRONIC DEVICE, AND STORAGE MEDIUM

(71) Applicant: HON HAI PRECISION INDUSTRY CO., LTD., New Taipei (TW)

(72) Inventor: Yen-Jen Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 356 days.

(21) Appl. No.: 17/551,472

(22) Filed: Dec. 15, 2021

(65) Prior Publication Data
US 2022/0200803 A1    Jun. 23, 2022

(30) Foreign Application Priority Data
Dec. 21, 2020    (CN) .......................... 202011522527.2

(51) Int. Cl.
*H04L 9/32*    (2006.01)
*G06F 1/26*    (2006.01)

(52) U.S. Cl.
CPC . *H04L 9/32* (2013.01); *G06F 1/26* (2013.01)

(58) Field of Classification Search
CPC ... H04L 9/32; H04L 63/12; H04L 9/50; H04L 67/10; H04L 12/18; G06F 1/26; G06F 18/23213; Y02D 10/00
See application file for complete search history.

(56) References Cited

U.S. PATENT DOCUMENTS

| | | | |
|---|---|---|---|
| 2021/0312444 A1* | 10/2021 | Liu | .......................... H04L 9/32 |
| 2022/0045930 A1* | 2/2022 | Williams | ................ H04L 43/50 |
| 2022/0129481 A1* | 4/2022 | Galindo | ................ H04L 63/108 |

* cited by examiner

*Primary Examiner* — Anh Nguyen
(74) *Attorney, Agent, or Firm* — ScienBiziP, P.C.

(57) ABSTRACT

A block operation method, an electronic device, and a storage medium are provided. A plurality of clusters are calculated according to computing power and rewards of each blockchain node, a node computing power and reward carried by each broadcast block being determined when a blockchain node receives a broadcast block. A target cluster to which a blockchain node belongs is determined, and a target difficulty weighting is determined, corresponding to the target cluster. A target difficulty of the target blockchain node is determined according to the node power and reward and the target difficulty weighting. A block is generated after the blockchain calculations are processed according to the target difficulty, the method improves decentralization of the blockchain.

20 Claims, 2 Drawing Sheets

BLOCK OPERATION METHOD, ELECTRONIC DEVICE, AND STORAGE MEDIUM

FIELD

The present application relates to a technical field of blockchain, and more particularly to a block operation method, an electronic device, and a storage medium.

BACKGROUND

In blockchaining, blockchain nodes with high operating power can complete operating tasks more quickly, effectively leading to a monopoly on blockchain operations by such nodes and receipt of rewards by such blockchain nodes. Decentralization, the core principle of blockchaining, is thus reduced.

Therefore, it is important to improve the decentralization of the blockchain.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below. Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Figure 1:
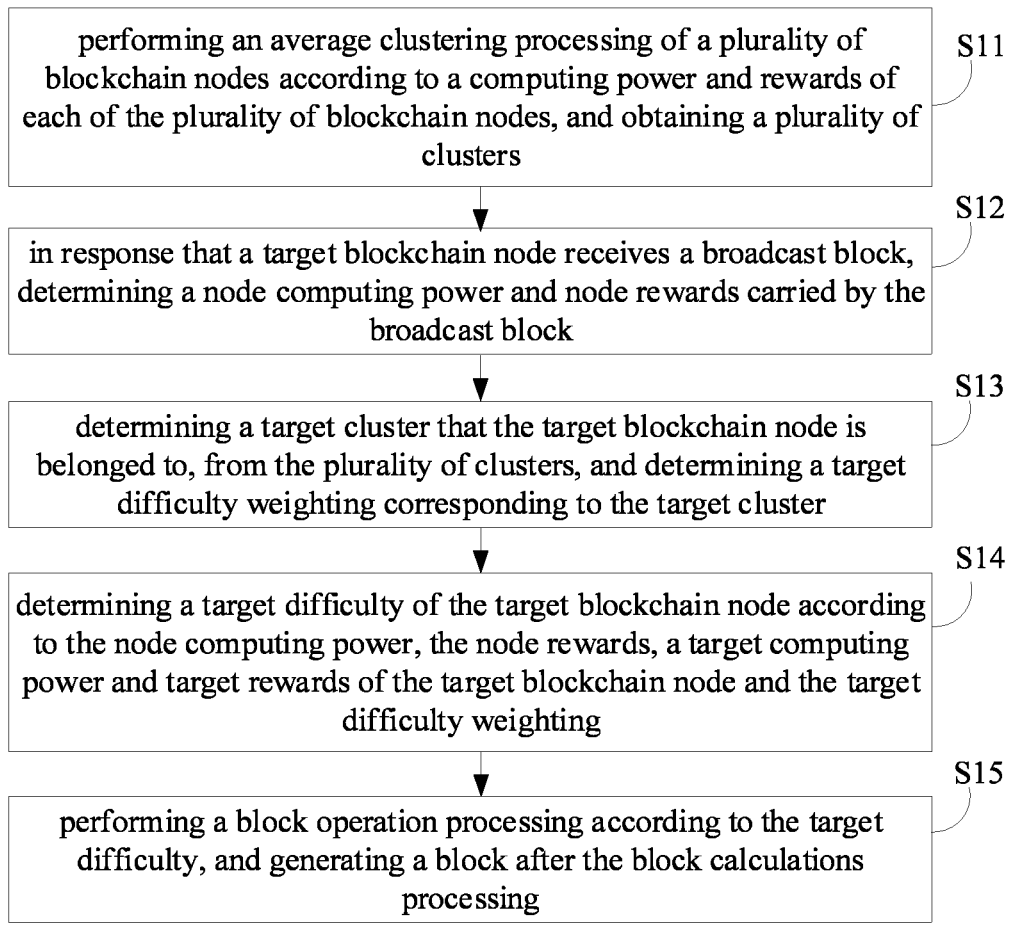
FIG. 1 is a flowchart diagram of a block operation method in an embodiment of the present application.

FIG. 1 is a flowchart diagram of a block operation method in an embodiment of the present application.

In one embodiment, the block operation method may be applied to one or more electronic devices 1. The electronic device 3 includes hardware such as, but is not limited to, a microprocessor and an Application Specific Integrated Circuit (ASIC), a Field-Programmable Gate Array (FPGA), a Digital Signal Processor (DSP), embedded devices, for example.

The electronic device 3 may be any electronic product that can interact with a user, such as a personal computer, a tablet computer, a smart phone, a personal digital assistant (Personal Digital Assistant, PDA), a game console, an interactive network television (Internet Protocol Television, IPTV), or smart wearable device, for example.

The electronic device 3 may also include a network device and/or a user device. The network device includes, but is not limited to, a single network server, a server group including multiple network servers, or a cloud including a large quantity of hosts or network servers based on a cloud computing technology.

A network can include, but is not limited to, the Internet, a wide area network, a metropolitan area network, a local area network, and a virtual private network (Virtual Private Network, VPN), for example.

In block S11, the electronic device 3 performs an average clustering processing of a plurality of blockchain nodes according to a computing power and rewards of each of the plurality of blockchain nodes, and obtains a plurality of clusters.

In one embodiment, the computing power (e.g., hash rate) is a measurement unit of a processing power of a bitcoin network. It is a speed at which the computer calculates an output of a hash function. The bitcoin network can perform intensive mathematical and encryption-related operations for security purposes. For example, in respond that the bitcoin network reaches a hash rate of 10 Th/s, this represents a performance of 10 trillion calculations per second. The computing power may be a data operating capability of the blockchain node, and the rewards refers to rewards obtained according to a preset reward mechanism in response to the blockchain node completing the computing task.

In one embodiment, the average clustering processing may refer to a k-means clustering algorithm, which is an iterative solution clustering analysis algorithm. The average clustering processing may include: dividing data into K groups in advance, then randomly selecting K objects as cluster centers, and calculating a distance between each object and each seed cluster center, and assigning each object to a cluster center that is closest to the object. The cluster centers and the objects assigned to the cluster centers themselves form a cluster. Each time a sample is allocated, the cluster centers of the cluster will be recalculated based on the existing objects in the cluster. This process is repeated until a specified termination condition is met. The termination condition can be that no cluster center changes again or that a predetermined minimum number of cluster centers changes.

A cluster can include a plurality of blockchain nodes, and a blockchain node can merely belong to one cluster.

In one embodiment, before performing an average clustering processing of a plurality of blockchain nodes according to a computing power and rewards of each of the blockchain nodes, and obtaining a plurality of clusters, the electronic device 3 obtains the computing power and rewards of each of the blockchain nodes. The electronic device 3 maps each of the blockchain nodes to a two dimensional (2D) coordinate system according to the computing power and rewards of each of the blockchain nodes, and coordinates are obtained corresponding to the each of the blockchain nodes. The computing power of each of the blockchain nodes is indicated by an abscissa, and the rewards of each of the blockchain nodes are indicated by an ordinate.

Moreover, the blockchain nodes correspond to the plurality of coordinates. The computing power of the blockchain nodes is the abscissa, and the rewards of the blockchain is the ordinate. For example, assuming that a quantized computing power of a blockchain node is 10, and a quantized reward is 15, the corresponding coordinates of the blockchain node are (10, 15).

Specifically, the coordinates corresponding to the each of the blockchain nodes are determined according to the computing power and the rewards of each of the blockchain nodes, an initial center point is determined from the coordinates. The coordinates are grouped according to the initial center point, and a plurality of initial groups are obtained. A first center point is obtained by recalculating centers of the plurality of initial groups. In response that the first center point is consistent with the initial center point, the average clustering processing is determined to be completed, and the initial groups are determined as the plurality of clusters.

In one embodiment, the coordinates corresponding to each blockchain node can be determined according to the computing power and the rewards of each blockchain node, such as coordinates (10, 10), (10, 15), (15, 10), for example. That is, each blockchain node has corresponding coordinates. One or more initial center points can be determined. For example, the initial center points have coordinates, such as (5, 5), (10, 10), for example. Based on the one or more initial center points, the blockchain nodes can be grouped by calculating a distance between each of the blockchain nodes and one of the initial center points. A blockchain node is allocated to a corresponding initial center point, which is closest to the blockchain node. Specifically, the distance can be calculated according to coordinates of the blockchain node and each of the initial center points, thereby determining the corresponding initial center point which is closest to the blockchain node. By repeating above allocation process, all of the blockchain nodes can be allocated. Thus, each initial center point corresponds to one or more blockchain nodes, and an initial group is obtained. Each initial group includes one or more blockchain nodes, which are allocated to a same initial center point. A first center point is obtained by recalculating centers of the initial groups. In response that the first center point is consistent with the initial center point, the average clustering processing is determined to be completed, and the initial groups are determined to be the clusters.

In one embodiment, in response that the first center point is inconsistent with the initial center point, the electronic device 3 regroups the coordinates according to the first center point, and obtains a plurality of first groups. The electronic device 3 calculates a plurality of second center points of the plurality of first groups. In response that the second center point is consistent with the first center point, the electronic device 3 determines that the average clustering processing is completed, and determines the first groups as being the clusters.

In response that the first center point is inconsistent with the initial center point, the electronic device 3 determines that the average clustering processing is not completed, the coordinates are regrouped according to the first center point, and the first groups are obtained. The second center points of the first groups are calculated. In response that the first center point is consistent with the initial center point, the electronic device 3 determines that the average clustering processing is completed, and the electronic device 3 determines the initial groups as the clusters.

In one embodiment, the electronic device 3 determines which node has the shortest distance among calculated distances from an origin of the 2D coordinate system to each of the blockchain nodes, and the electronic device 3 determines which node has the longest distance from the calculated distances. The electronic device 3 determines a difference in distance between the shortest and the longest distances. The electronic device 3 determines such difference in distance as the preset first distance.

For example, the coordinates of the shortest-distance node are (1, 0), and the corresponding calculated distance is 1. The coordinates of the longest-distance node are (10, 0), and the corresponding calculated distance is 10. Then the preset first distance is 9.

In block S12, in response that a target blockchain node receives a broadcast block, the electronic device 3 determines a node computing power and node rewards carried by the broadcast block.

In one embodiment, the broadcast block may be a packaged block after a specified blockchain node has completed an operation task, and the packaged block will be broadcast to other blockchain nodes.

The broadcast block carries the computing power and rewards of the blockchain nodes in the package of the broadcast block.

In one embodiment, after the electronic device 3 performs an average clustering processing of a plurality of blockchain nodes according to a computing power and rewards of each of the blockchain nodes, obtains a plurality of clusters. In response that a target blockchain node receives a broadcast block, the electronic device 3 determines a node computing power and node rewards carried by the broadcast block, the electronic device 3 determines a center coordinate of each of the clusters. The electronic device 3 determines a third distance between the center coordinate and the origin of the 2D coordinate system. The electronic device 3 allocates a difficulty weighting to each of the clusters according to the third distance.

For example, there are 3 clusters, a third distance of cluster A is 1, a third distance of cluster B is 3, and a third distance of cluster C is 5. Then the total number of clusters is 3, the third distance of cluster A is less than the third distance of cluster B, and the third distance of cluster B is less than the third distance of cluster C, then the difficulty weighting corresponding to the cluster A is ⅓, the difficulty weighting corresponding to the cluster B is ⅔, and the difficulty weighting corresponding to the cluster C is 3/3.

In block S13, the electronic device 3 determines a target cluster that the target blockchain node is belonged to, from the clusters, and determines a target difficulty weighting corresponding to the target cluster.

In one embodiment, different clusters have different difficulty weightings. A cluster includes at least one blockchain node, and a blockchain node can belong to only one cluster.

In block S14, the electronic device 3 determines a target difficulty of the target blockchain node according to the node computing power, the node rewards, a target computing power and target rewards of the target blockchain node, and the target difficulty weighting.

In one embodiment, the degree of difficulty can be used to control an average generation time of the block. When the difficulty degree is higher, it is more difficult for the blockchain node to complete the operation. Conversely, when the difficulty degree is lower, it is easier for the blockchain node to complete the operation.

Specifically, node coordinates of each of the blockchain nodes are determined, the node coordinates corresponding to the node computing power and the node rewards. Target coordinates corresponding to the target computing power and the target rewards of the target blockchain node are determined. A second distance is calculated between the node coordinates and the target coordinates, and a preset first distance is obtained. The target difficulty is determined according to the preset first distance, the second distance, and the target difficulty weighting.

For example, a node computing power is 28 and a node reward is 14, the node coordinates can be (28, 14). A target blockchain node A and a target blockchain node B receive the broadcast block and verify validity of the broadcast block. For example, a first distance is 30. A second distance between the target blockchain node A and the node coordinates is 15, and the difficulty weighting corresponding to the target cluster is 1. The distance between the target blockchain node B and the node coordinates is 15, the difficulty weighting corresponding to the target cluster is ⅓, and the total number of clusters is 3. The target difficulty calculated by the target blockchain node A is $(1-15/30)*(1/1)*2^{256}=0.5*2^{256}$. The target difficulty calculated by the target blockchain node B is $(1-15/30)*(⅓)*2^{256}=0.16*2^{256}$.

In block S15, the electronic device 3 performs a block operation processing according to the target difficulty, and generates a block after the block calculations processing.

In one embodiment, all blockchain nodes can process a block ("calculation task") at the same time. The block operation refers to a calculation task. In respond that a blockchain node completes the calculation task, a block is generated and added into the blockchain. The computing power and rewards of the blockchain node can be packaged into the block, and then the packaged block is broadcast to other blockchain nodes, and other blockchain nodes start the next calculation task after receiving the solved broadcast block.

In the above embodiments, the operation difficulty can be adjusted according to the computing power and rewards of the blockchain nodes, it can be ensured that the blockchain nodes with low computing power can complete the operation and receive rewards. Thus, the decentralization of the blockchain is improved.

Figure 2:
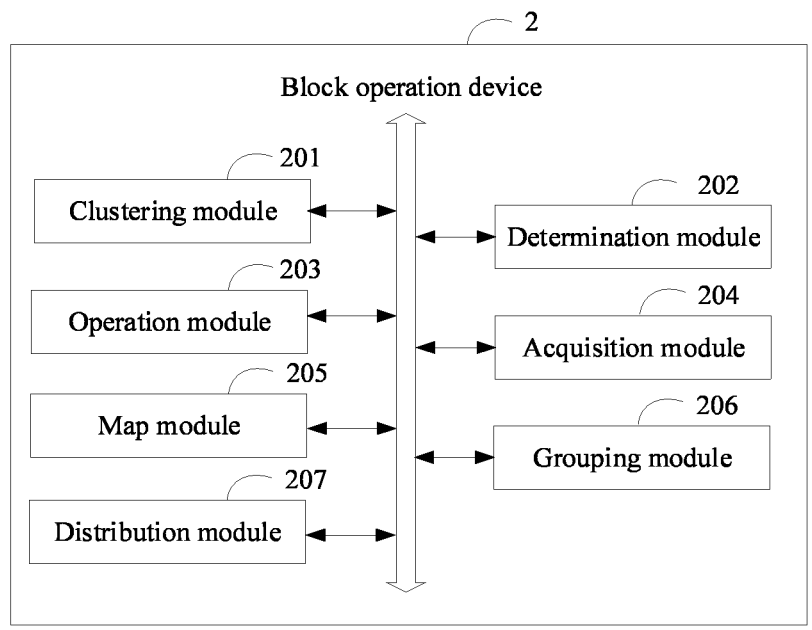
FIG. 2 is a structural diagram of a block operation device in an embodiment of the present application.

FIG. 2 is a structural diagram of a block operation device in an embodiment of the present application.

As shown in FIG. 2, a block operation device 2 includes a clustering module 201, a determination module 202, an operation module 203, an acquisition module 204, a map module 205, a grouping module 206, and a distribution module 207. The modules in the present application refer to one of a stored series of computer-readable instruction segments that can be executed by at least one processor and that are capable of performing preset functions. In some embodiments, the functions of each module will be described.

The clustering module 201 performs an average clustering processing of a plurality of blockchain nodes according to a computing power and rewards of each blockchain node, and obtains a plurality of clusters.

In one embodiment, the computing power (e.g., hash rate) is a measurement unit of a processing power of a bitcoin network. It is a speed at which the computer calculates an output of a hash function. The bitcoin network can perform intensive mathematical and encryption-related operations for security purposes. For example, in respond that the bitcoin network reaches a hash rate of 10 Th/s, this indicates a performance of 10 trillion calculations per second. The computing power may be a data operating capability of the blockchain node, and the rewards refers to rewards obtained according to a preset reward mechanism when the blockchain node completes the computing task.

In one embodiment, the average clustering processing may refer to a k-means clustering algorithm, which is an iterative solution clustering analysis algorithm. The average clustering processing may include: dividing data into K groups in advance, then randomly selecting K objects as cluster centers, and calculating a distance between each object and each seed cluster center, and allocating each object to a cluster center that is closest to the object. The cluster centers and the objects allocated to the cluster centers themselves form a cluster. Each time a sample is allocated, the cluster centers of the cluster will be recalculated based on the existing objects in the cluster. This process is repeated until a specified termination condition is met. The termination condition can be that no cluster center changes again or that a predetermined minimum number of cluster centers do change.

A cluster can include a plurality of blockchain nodes, and a blockchain node merely belongs to one cluster.

In one embodiment, before performing an average clustering processing of a plurality of blockchain nodes according to a computing power and rewards of each of the blockchain nodes, and obtaining a plurality of clusters, the acquisition module 204 obtains the computing power and rewards of each of the blockchain nodes. The map module 205 maps each of the blockchain nodes to a two dimensional (2D) coordinate system according to the computing power and rewards of each of the blockchain nodes, and coordinates are obtained corresponding to the each of the blockchain nodes. The computing power of each of the blockchain nodes is indicated by an abscissa, and the rewards of each of the blockchain nodes are indicated by an ordinate.

Moreover, the blockchain nodes correspond to the plurality of coordinates. The computing power of the blockchain nodes is the abscissa, and the rewards of the blockchain is the ordinate. For example, assuming that a quantized computing power of a blockchain node is 10, and a quantized reward is 15, the corresponding coordinates of the blockchain node are (10, 15).

Specifically, the coordinates corresponding to the each of the blockchain nodes are determined according to the computing power and the rewards of each of the blockchain nodes, an initial center point is determined from the coordinates. The coordinates are grouped according to the initial center point, and a plurality of initial groups are obtained. A first center point is obtained by recalculating centers of the plurality of initial groups. In response that the first center point is consistent with the initial center point, the average clustering processing is determined to be completed, and the initial groups are determined as the plurality of clusters.

In one embodiment, the coordinates corresponding to each blockchain node can be determined according to the computing power and the rewards of each blockchain node, such as coordinates (10, 10), (10, 15), (15, 10), for example. That is, each blockchain node has corresponding coordinates. One or more initial center points can be determined. For example, the initial center points have coordinates, such as (5, 5), (10, 10), for example. Based on the one or more initial center points, the blockchain nodes can be grouped by calculating a distance between each of the blockchain nodes and one of the initial center points. A blockchain node is allocated to a corresponding initial center point, which is closest to the blockchain node. Specifically, the distance can be calculated according to coordinates of the blockchain node and each of the initial center points, thereby determining the corresponding initial center point, which is closest to the blockchain node. By repeating above allocation process, all of the blockchain nodes can be allocated. Thus, each initial center point corresponds to one or more blockchain nodes, and an initial groups is obtained. Each initial group includes one or more blockchain nodes, which are allocated to a same initial center point. A first center point is obtained by recalculating centers of the initial groups. In response that the first center point is consistent with the initial center point, the average clustering processing is determined to be completed, and the initial groups are determined to be the clusters.

In one embodiment, in response that the first center point is inconsistent with the initial center point, the grouping module 206 regroups the coordinates according to the first center point, and obtains a plurality of first groups. The operation module 203 calculates a plurality of second center points of the plurality of first groups. In response that the second center point is consistent with the first center point, the determination module 202 determines that the average clustering processing is completed, and determines the first groups as being the clusters.

In response that the first center point is inconsistent with the initial center point, the determination module 202 determines that the average clustering processing is not completed, the coordinates are regrouped according to the first center point, and the first groups are obtained. The second center points of the first groups are calculated. In response that the first center point is consistent with the initial center point, the determination module 202 determines that the average clustering processing is completed, and the determination module 202 determines the initial groups as the clusters.

In one embodiment, the determination module 202 determines t which node has the shortest distance among calculated distances from an origin of the 2D coordinate system to each of the blockchain nodes, and the determination module 202 determines which node has the longest distance from the calculated distances. The determination module 202 determines a difference in distance between the shortest and the longest distances. The determination module 202 determines such difference in distance as the preset first distance.

For example, the coordinates of the shortest-distance node are (1, 0), and the corresponding calculated distance is 1. The coordinates of the longest-distance node are (10, 0), and the corresponding calculated distance is 10. Then the preset first distance is 9.

In response that a target blockchain node receives a broadcast block, the determination module 202 determines a node computing power and node rewards carried by the broadcast block.

In one embodiment, the broadcast block may be a packaged block after a specified blockchain node has completed an operation task, and the packaged block will be broadcast to other blockchain nodes.

The broadcast block carries the computing power and rewards of the blockchain nodes in the package of the broadcast block.

In one embodiment, after the clustering module 201 performs an average clustering processing of a plurality of blockchain nodes according to a computing power and rewards of each of the blockchain nodes, obtains a plurality of clusters. In response that a target blockchain node receives a broadcast block, the determination module 202 determines a node computing power and node rewards carried by the broadcast block, the determination module 202 determines a center coordinate of each of the clusters. The determination module 202 determines a third distance between the center coordinate and the origin of the 2D coordinate system. The distribution module 207 allocates a difficulty weighting to each of the clusters according to the third distance.

For example, there are 3 clusters, a third distance of cluster A is 1, a third distance of cluster B is 3, and a third distance of cluster C is 5. Then the total number of clusters is 3, the third distance of cluster A is less than the third distance of cluster B, and the third distance of cluster B is less than the third distance of cluster C, then the difficulty weighting corresponding to the cluster A is ⅓, the difficulty weighting corresponding to the cluster B is ⅔, and the difficulty weighting corresponding to the cluster C is 3/3.

The determination module 202 determines a target cluster that the target blockchain node is belonged to, from the clusters, and determines a target difficulty weighting corresponding to the target cluster.

In one embodiment, different clusters have different difficulty weightings. A cluster includes at least one blockchain node, and a blockchain node can belong to only one cluster.

The determination module 202 determines a target difficulty of the target blockchain node according to the node computing power, the node rewards, a target computing power and target rewards of the target blockchain node, and the target difficulty weighting.

In one embodiment, the degree of difficulty can be used to control an average generation time of the block. When the difficulty degree is higher, it is more difficult for the blockchain node to complete the operation. Conversely, when the difficulty degree is lower, it is easier for the blockchain node to complete the operation.

Specifically, node coordinates of each of the blockchain nodes are determined, the node coordinates corresponding to the node computing power and the node rewards. Target coordinates corresponding to the target computing power and the target rewards of the target blockchain node are determined. A second distance is calculated between the node coordinates and the target coordinates, and a preset first distance is obtained. The target difficulty is determined according to the preset first distance, the second distance, and the target difficulty weighting.

For example, a node computing power is 28 and a node reward is 14, the node coordinates can be (28, 14). A target blockchain node A and a target blockchain node B receive the broadcast block and verify validity of the broadcast block. For example, a first distance is 30. A second distance between the target blockchain node A and the node coordinates is 15, and the difficulty weighting corresponding to the target cluster is 1. The distance between the target blockchain node B and the node coordinates is 15, the difficulty weighting corresponding to the target cluster is ⅓, and the total number of clusters is 3. The target difficulty calculated by the target blockchain node A is $(1-15/30)*(1/1)*2^{256}=0.5*2^{256}$. The target difficulty calculated by the target blockchain node B is $(1-15/30)*(⅓)*2^{256}=0.16*2^{256}$.

The operation module 203 performs a block operation processing according to the target difficulty, and generates a block after the block calculations processing.

In one embodiment, all blockchain nodes can process a block ("calculation task") at the same time. The block operation refers to a calculation task. In respond that a blockchain node completes the calculation task, a block is generated and added into the blockchain. The computing power and rewards of the blockchain node can be packaged into the block, and then the packaged block is broadcast to other blockchain nodes, and other blockchain nodes starts the next calculation task after receiving the solved broadcast block.

In the above embodiments, the operation difficulty can be adjusted according to the computing power and rewards of the blockchain nodes, it can be ensured that the blockchain nodes with low computing power can complete the operation and receive rewards. Thus, the decentralization of the blockchain is improved.

Figure 3:
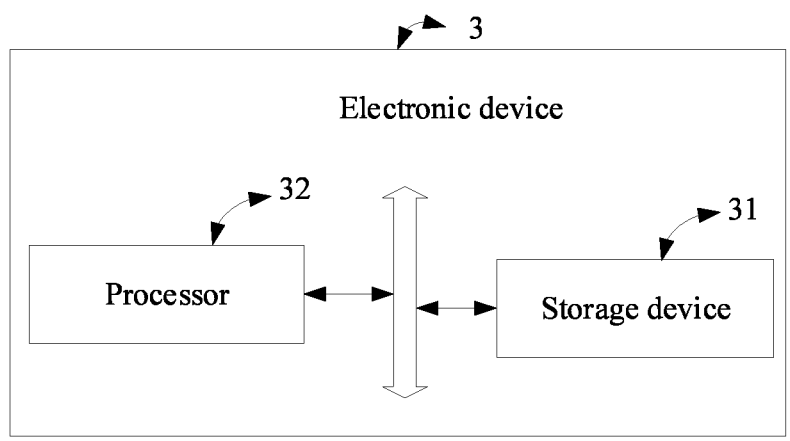
FIG. 3 is a structural diagram of an electronic device in an embodiment of the present application.

FIG. 3 is a structural diagram of an electronic device in an embodiment of the present application. The electronic device 3 may include a storage device 31, at least one processor 32, and computer-readable instructions stored in the storage device 31 and executable by the at least one processor 32, for example, a growth height of a plant determination programs.

Those skilled in the art will understand that FIG. 3 is only an example of the electronic device 3 and does not constitute a limitation on the electronic device 3. Another electronic device 3 may include more or fewer components than shown in the figures or may combine some components or have different components. For example, the electronic device 3 may further include an input/output device, a network access device, a bus, and the like.

The at least one processor 32 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 32 can be a microprocessor or any conventional processor. The processor 32 is a control center of the electronic device 3 and connects various parts of the entire electronic device 3 by using various interfaces and lines.

The processor 32 executes the computer-readable instructions to implement the block operation method in the above embodiments, such as in block S11-S15 shown in FIG. 1. Alternatively, the processor 32 executes the computer-readable instructions to implement the functions of the modules/units in the foregoing device embodiments, such as the modules 201-207 in FIG. 2.

For example, the computer-readable instructions can be divided into one or more modules/units, and the one or more modules/units are stored in the storage device 31 and executed by the at least one processor 32. The one or more modules/units can be a series of computer-readable instruction segments capable of performing specific functions, and the instruction segments are used to describe execution processes of the computer-readable instructions in the electronic device 3. For example, the computer-readable instruction can be divided into the clustering module 201, the determination module 202, the operation module 203, the acquisition module 204, the map module 205, the grouping module 206, and the distribution module 207 as shown in FIG. 2.

The storage device 31 can be configured to store the computer-readable instructions and/or modules/units. The processor 32 may run or execute the computer-readable instructions and/or modules/units stored in the storage device 31 and may call up data stored in the storage device 31 to implement various functions of the electronic device 3. The storage device 31 mainly includes a storage program area and a storage data area. The storage program area may store an operating system, and an application program required for at least one function (such as a sound playback function, an image playback function, for example), for example. The storage data area may store data (such as audio data, phone book data, for example) created during the use of the electronic device 3. In addition, the storage device 31 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

The storage device 31 may be an external memory and/or an internal memory of the electronic device 3. The storage device 31 may be a memory in a physical form, such as a memory stick, a Trans-flash Card (TF card), for example.

When the modules/units integrated into the electronic device 3 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

With reference to FIG. 1, the storage device 31 in the electronic device 3 stores a plurality of instructions to implement a block operation method, and the processor 32 can execute the multiple instructions to: perform an average clustering processing of a plurality of blockchain nodes according to a computing power and rewards of each of the plurality of blockchain nodes, and obtain a plurality of clusters; in response that a target blockchain node receives a broadcast block, determine a node computing power and node rewards carried by the broadcast block; determine a target cluster that the target blockchain node is belonged to, from the plurality of clusters, and determine a target difficulty weighting corresponding to the target cluster; determine a target difficulty of the target blockchain node according to the node computing power, the node rewards, a target computing power and target rewards of the target blockchain node and the target difficulty weighting; perform a block operation processing according to the target difficulty, and generate a block after the block calculations processing.

The computer-readable instructions are executed by the processor 32 to realize the functions of each module/unit in the above-mentioned device embodiments, which will not be repeated here.

In the several embodiments provided in the preset application, the disclosed electronic device and method can be implemented in other ways. For example, the embodiments of the devices described above are merely illustrative. For example, divisions of the modules are based on logical function only, and there can be other manners of division in actual implementation.

In addition, each functional module in each embodiment of the present disclosure can be integrated into one processing module, or can be physically present separately in each unit or two or more modules can be integrated into one module. The above modules can be implemented in a form of hardware or in a form of a software functional unit.

Therefore, the present embodiments are considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

Moreover, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A block operation method, the method comprising:
   performing an average clustering processing of a plurality of blockchain nodes according to a computing power and rewards of each of the plurality of blockchain nodes, and obtaining a plurality of clusters;
   in response that a target blockchain node receives a broadcast block, determining a node computing power and node rewards carried by the broadcast block;
   determining a target cluster that the target blockchain node is belonged to, from the plurality of clusters, and determining a target difficulty weighting corresponding to the target cluster;
   determining a target difficulty of the target blockchain node according to the node computing power, the node rewards, a target computing power and target rewards of the target blockchain node, and the target difficulty weighting;
   performing a block operation processing according to the target difficulty, and generating a block after the block calculations processing.

2. The block operation method of claim 1, before performing the average clustering processing of the plurality of blockchain nodes according to the computing power and the rewards of each of the plurality of blockchain nodes, and obtaining the plurality of clusters, further comprising:
   obtaining the computing power and the rewards of each of the plurality of blockchain nodes;
   mapping each of the plurality of blockchain nodes to a two dimensional (2D) coordinate system according to the computing power and the rewards of each of the plurality of blockchain nodes, and obtaining coordinates corresponding to the each of the plurality of blockchain nodes, wherein the computing power of each of the plurality of blockchain nodes is an abscissa, and the rewards of each of the plurality of blockchain nodes is an ordinate.

3. The block operation method of claim 2, wherein determining the target difficulty of the target blockchain node according to the node computing power, the node rewards, the target computing power and the target rewards of the target blockchain node, and the target difficulty weighting comprises:
   determining node coordinates of each of the plurality of blockchain nodes, the node coordinates corresponding to the node computing power and the node rewards;
   determining target coordinates corresponding to the target computing power and the target rewards of the target blockchain node;
   calculating a second distance between the node coordinates and the target coordinates;
   obtaining a preset first distance;
   determining the target difficulty according to the preset first distance, the second distance, and the target difficulty weighting.

4. The block operation method of claim 3, before performing the average clustering processing of the plurality of blockchain nodes according to the computing power and the rewards of each of the plurality of blockchain nodes, and obtaining the plurality of clusters, further comprising:
   determining a smallest node with a smallest distance among calculated distances from an origin of the 2D coordinate system to each of the plurality of blockchain nodes, and determining a largest node with a largest distance from the calculated distances;
   determining a distance difference between the smallest distance and the largest distance;
   determining the distance difference as the preset first distance.

5. The block operation method of claim 2, after performing the average clustering processing of the plurality of blockchain nodes according to the computing power and the rewards of each of the plurality of blockchain nodes, and obtaining the plurality of clusters, and before in response that the target blockchain node receives the broadcast block, determining the node computing power and the node rewards carried by the broadcast block, further comprising:
   determining a center coordinate of each of the plurality of clusters;
   determining a third distance between the center coordinate and an origin of the 2D coordinate system;
   allocating a difficulty weighting to each of the plurality of clusters according to the third distance.

6. The block operation method of claim 1, wherein performing the average clustering processing of the plurality of blockchain nodes according to the computing power and the rewards of each of the plurality of blockchain nodes, and obtaining the plurality of clusters comprises:
   determining a plurality of coordinates corresponding to the each of the plurality of blockchain nodes according to the computing power and the rewards of each of the plurality of blockchain nodes;
   determining an initial center point from the plurality of coordinates;
   grouping the plurality of coordinates according to the initial center point, and obtaining a plurality of initial groups;
   recalculating centers of the plurality of initial groups, and obtaining a first center point;
   in response that the first center point is consistent with the initial center point, determining that the average clustering processing is completed, and determining the plurality of initial groups as the plurality of clusters.

7. The block operation method of claim 6, the method further comprising:
   in response that the first center point is inconsistent with the initial center point, regrouping the plurality of coordinates according to the first center point, and obtaining a plurality of first groups;
   calculating a plurality of second center points of the plurality of first groups;
   in response that the second center point is consistent with the first center point, determining that the average clustering processing is completed, and determining the plurality of first groups as the plurality of clusters.

8. An electronic device comprising:
   a processor; and
   a storage device storing a plurality of instructions, which when executed by the processor, cause the processor to:

perform an average clustering processing of a plurality of blockchain nodes according to a computing power and rewards of each of the plurality of blockchain nodes, and obtain a plurality of clusters;
in response that a target blockchain node receives a broadcast block, determine a node computing power and node rewards carried by the broadcast block;
determine a target cluster that the target blockchain node is belonged to, from the plurality of clusters, and determine a target difficulty weighting corresponding to the target cluster;
determine a target difficulty of the target blockchain node according to the node computing power, the node rewards, a target computing power and target rewards of the target blockchain node, and the target difficulty weighting;
perform a block operation processing according to the target difficulty, and generate a block after the block calculations processing.

9. The electronic device of claim 8, wherein the processor is further caused to:
obtain the computing power and the rewards of each of the plurality of blockchain nodes;
map each of the plurality of blockchain nodes to a two dimensional (2D) coordinate system according to the computing power and the rewards of each of the plurality of blockchain nodes, and obtain coordinates corresponding to the each of the plurality of blockchain nodes, wherein the computing power of each of the plurality of blockchain nodes is an abscissa, and the rewards of each of the plurality of blockchain nodes is an ordinate.

10. The electronic device of claim 9, wherein the processor is further caused to:
determine node coordinates of each of the plurality of blockchain nodes, the node coordinates corresponding to the node computing power and the node rewards;
determine target coordinates corresponding to the target computing power and the target rewards of the target blockchain node;
calculate a second distance between the node coordinates and the target coordinates;
obtain a preset first distance;
determine the target difficulty according to the preset first distance, the second distance, and the target difficulty weighting.

11. The electronic device of claim 10, wherein the processor is further caused to:
determining a smallest node with a smallest distance among calculated distances from an origin of the 2D coordinate system to each of the plurality of blockchain nodes, and determining a largest node with a largest distance from the calculated distances;
determine a distance difference between the smallest distance and the largest distance;
determine the distance difference as the preset first distance.

12. The electronic device of claim 9, wherein the processor is further caused to:
determine a center coordinate of each of the plurality of clusters;
determine a third distance between the center coordinate and an origin of the 2D coordinate system;
allocate a difficulty weighting to each of the plurality of clusters according to the third distance.

13. The electronic device of claim 8, wherein the processor is further caused to:
determine a plurality of coordinates corresponding to the each of the plurality of blockchain nodes according to the computing power and the rewards of each of the plurality of blockchain nodes;
determine an initial center point from the plurality of coordinates;
group the plurality of coordinates according to the initial center point, and obtain a plurality of initial groups;
recalculate centers of the plurality of initial groups, and obtain a first center point;
in response that the first center point is consistent with the initial center point, determine that the average clustering processing is completed, and determine the plurality of initial groups as the plurality of clusters.

14. The electronic device of claim 13, wherein the processor is further caused to:
in response that the first center point is inconsistent with the initial center point, regroup the plurality of coordinates according to the first center point, and obtain a plurality of first groups;
calculate a plurality of second center points of the plurality of first groups;
in response that the second center point is consistent with the first center point, determine that the average clustering processing is completed, and determine the plurality of first groups as the plurality of clusters.

15. A non-transitory storage medium having stored thereon at least one computer-readable instructions that, when executed by a processor of an electronic device, causes the processor to perform a block operation method, the method comprising:
performing an average clustering processing of a plurality of blockchain nodes according to a computing power and rewards of each of the plurality of blockchain nodes, and obtaining a plurality of clusters;
in response that a target blockchain node receives a broadcast block, determining a node computing power and node rewards carried by the broadcast block;
determining a target cluster that the target blockchain node is belonged to, from the plurality of clusters, and determining a target difficulty weighting corresponding to the target cluster;
determining a target difficulty of the target blockchain node according to the node computing power, the node rewards, a target computing power and target rewards of the target blockchain node, and the target difficulty weighting;
performing a block operation processing according to the target difficulty, and generating a block after the block calculations processing.

16. The non-transitory storage medium of claim 15, before performing the average clustering processing of the plurality of blockchain nodes according to the computing power and the rewards of each of the plurality of blockchain nodes, and obtaining the plurality of clusters, wherein the method further comprises:
obtaining the computing power and the rewards of each of the plurality of blockchain nodes;
mapping each of the plurality of blockchain nodes to a two dimensional (2D) coordinate system according to the computing power and the rewards of each of the plurality of blockchain nodes, and obtaining coordinates corresponding to the each of the plurality of blockchain nodes, wherein the computing power of each of the plurality of blockchain nodes is an abscissa, and the rewards of each of the plurality of blockchain nodes is an ordinate.

17. The non-transitory storage medium of claim 16, wherein determining the target difficulty of the target blockchain node according to the node computing power, the node rewards, the target computing power and the target rewards of the target blockchain node, and the target difficulty weighting comprises:
- determining node coordinates of each of the plurality of blockchain nodes, the node coordinates corresponding to the node computing power and the node rewards;
- determining target coordinates corresponding to the target computing power and the target rewards of the target blockchain node;
- calculating a second distance between the node coordinates and the target coordinates;
- obtaining a preset first distance;
- determining the target difficulty according to the preset first distance, the second distance, and the target difficulty weighting.

18. The non-transitory storage medium of claim 17, before performing the average clustering processing of the plurality of blockchain nodes according to the computing power and the rewards of each of the plurality of blockchain nodes, and obtaining the plurality of clusters, wherein the method further comprises:
- determining a smallest node with a smallest distance among calculated distances from an origin of the 2D coordinate system to each of the plurality of blockchain nodes, and determining a largest node with a largest distance from the calculated distances;
- determining a distance difference between the smallest distance and the largest distance;
- determining the distance difference as the preset first distance.

19. The non-transitory storage medium of claim 16, after performing the average clustering processing of the plurality of blockchain nodes according to the computing power and the rewards of each of the plurality of blockchain nodes, and obtaining the plurality of clusters, and before in response that the target blockchain node receives the broadcast block, determining the node computing power and the node rewards carried by the broadcast block, wherein the method further comprises:
- determining a center coordinate of each of the plurality of clusters;
- determining a third distance between the center coordinate and an origin of the 2D coordinate system;
- allocating a difficulty weighting to each of the plurality of clusters according to the third distance.

20. The non-transitory storage medium of claim 15, wherein performing the average clustering processing of the plurality of blockchain nodes according to the computing power and the rewards of each of the plurality of blockchain nodes, and obtaining the plurality of clusters comprises:
- determining a plurality of coordinates corresponding to the each of the plurality of blockchain nodes according to the computing power and the rewards of each of the plurality of blockchain nodes;
- determining an initial center point from the plurality of coordinates;
- grouping the plurality of coordinates according to the initial center point, and obtaining a plurality of initial groups;
- recalculating centers of the plurality of initial groups, and obtaining a first center point;
- in response that the first center point is consistent with the initial center point, determining that the average clustering processing is completed, and determining the plurality of initial groups as the plurality of clusters.

* * * * *